Nov. 26, 1968     B. GENUALDI ETAL     3,413,553
METHOD OF SEPARATING CONDUCTORS EXTENDING FROM AN ELECTRICAL
COMPONENT FOR TESTING PURPOSES

Filed April 14, 1965     3 Sheets-Sheet 1

INVENTORS
BENJAMIN GENUALDI &
ANGELO CHECKI, JR.
BY

Attorney

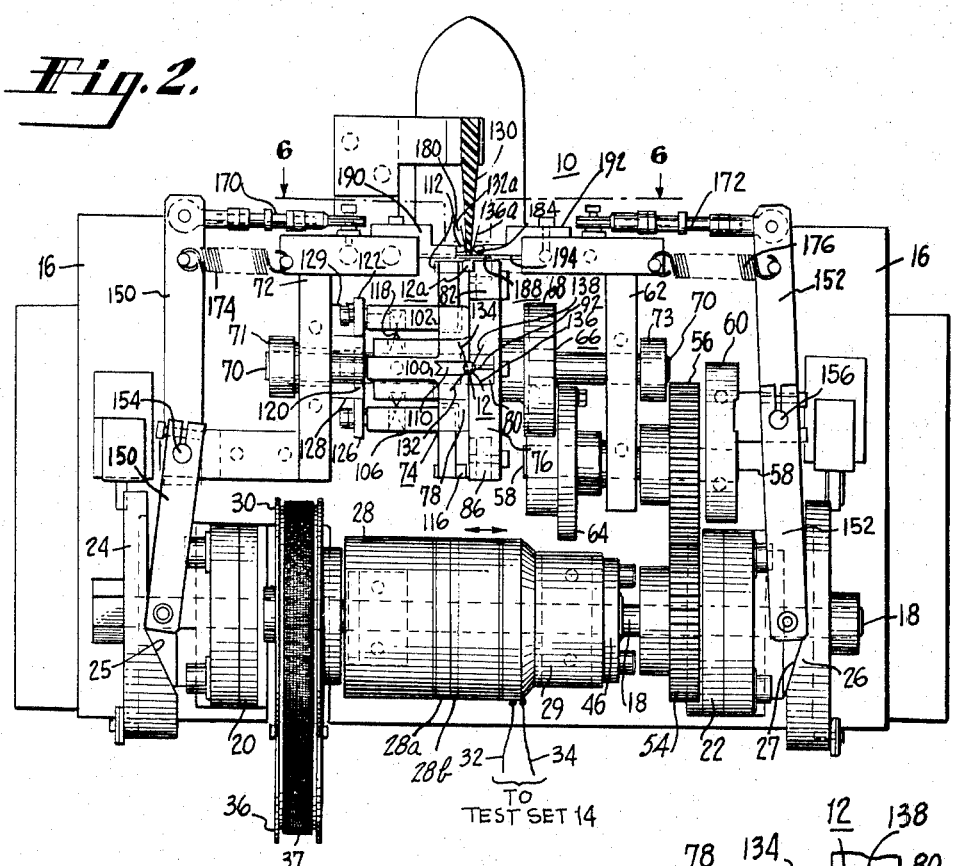
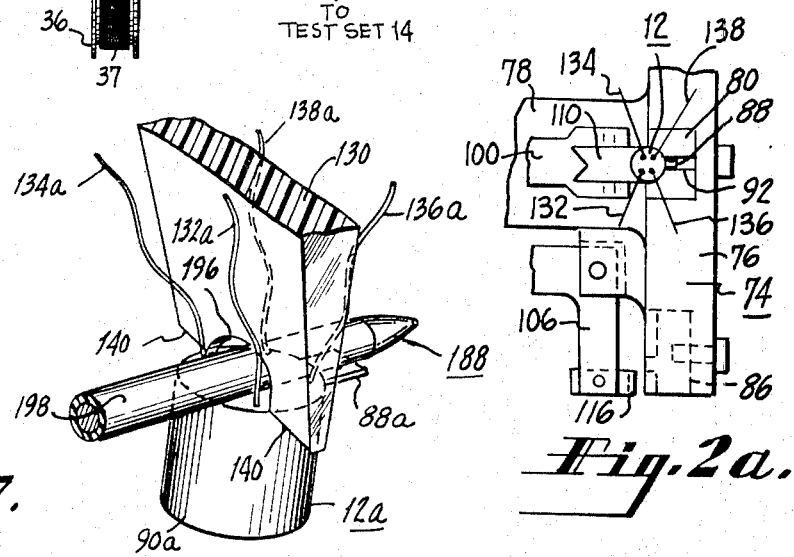

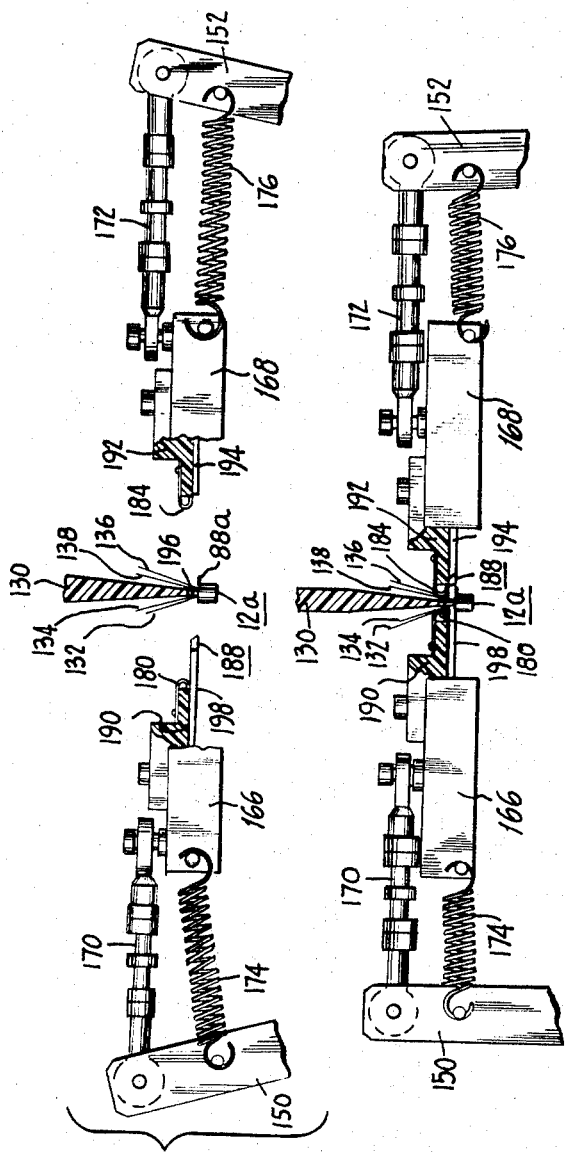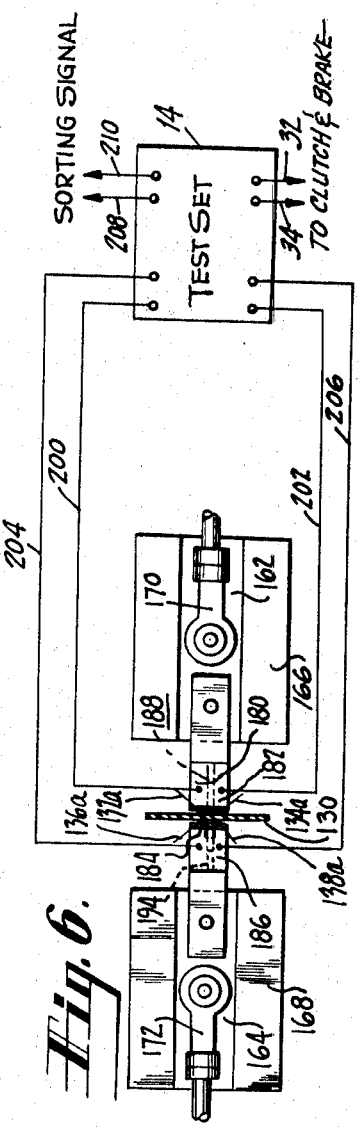

United States Patent Office 3,413,553
Patented Nov. 26, 1968

3,413,553
METHOD OF SEPARATING CONDUCTORS EXTENDING FROM AN ELECTRICAL COMPONENT FOR TESTING PURPOSES
Benjamin Genualdi, Summit, and Angelo Checki, Jr., Lyndhurst, N.J., assignors to Radio Corporation of America, a corporation of Delaware
Filed Apr. 14, 1965, Ser. No. 448,049
3 Claims. (Cl. 324—158)

ABSTRACT OF THE DISCLOSURE

A method of separating an array of conductors extending from one side of an electrical component for testing purposes comprises the steps of (1) disposing a first insulating member in the array to divide the conductors into two groups, (2) disposing a second insulating member in the array, transversely to the first insulating member and adjacent to the component, to separate the conductors into at least three groups, and (3) moving at least two (test input) contacts toward each other from opposite sides of the first insulating member and adjacent to the second insulating member to engage at least two of the conductors, respectively.

---

This invention relates generally to a method of preparing and presenting an electrical component for testing purposes. More particularly, the invention relates to a method of separating the conductors in an array of flexible conductors extending from an electrical component for connecting them to electrical contacts. The improved method of the invention is especially useful for presenting a plurality of transistors sequentially to the electrical input means of apparatus for testing purposes.

It has been proposed to test electronic components, such as transistors, by a method comprising the steps of (1) straightening the flexible conductors of the transistor, (2) plugging the transistor into a socket connected to the input of suitable testing equipment, and (3) unplugging the transistor after the test has been completed. While such a method may be satisfactory for testing certain electrical components, it is relatively time consuming for testing transistors that have long, thin, flexible conductors because the conductors usually have to be straightened before each transistor is plugged into a relatively small socket. In such a prior art testing method, one operator usually straightens the conductors of the transistors and another operator plugs and unplugs the transistors into the socket for testing purposes, thereby usually requiring two operators to perform the method.

It is an object of the present invention to provide an improved method of preparing and presenting an electrical component for testing purposes that is relatively faster and that requires fewer operators than the aforementioned prior art method.

Another object of the present invention is to provide an improved method of presenting an electrical component to test equipment without using a socket for receiving the component, whereby the frequent need for replacing worn-out sockets is obviated.

A further object of the present invention is to provide a method of the type described that is relatively more economical to perform and yet highly efficient in use.

While the improved method of preparing an electrical component for testing purposes, in accordance with the present invention, will be described in connection with the testing of transistors, it will be understood that the invention may be applied to many other electrical components and modules that have a plurality of conductors or leads extending from one side thereof.

One embodiment of the improved method of separating the conductors in an array of conductors extending from a transistor for subsequently connecting the conductors to electrical contacts comprises the steps of (1) disposing a first insulating member in the array of conductors to separate them into two groups, and (2) disposing a second insulating member in the array, transversely to the first insulating member, whereby to separate the conductors into at least three groups. In another embodiment of the improved method, in addition to the aforementioned steps, at least two electrical contacts are moved toward each other from opposite sides of the first insulating member to make electrical connections with the conductors in at least two of the aforementioned groups, respectively. The electrical contacts are connected to the input means of suitable testing equipment.

The novel features of the present method, both as to its organization and performance, as well as additional objects and advantages thereof, will be more readily understood from the following description, when read in connection with the accompanying drawings in which similar reference characters represent similar parts throughout, and in which:

FIG. 2 is a plan view of the apparatus illustrated in FIG. 1, a vertical separator blade being shown in cross-section for the sake of clarity;

FIG. 2A is an enlarged, fragmentary view of a portion of FIG. 2, showing a transistor under test in the loading position;

FIG. 4 is an enlarged, fragmentary, plan view of the apparatus illustrated in FIG. 2, but showing the electrical contacts disengaged from the conductors of the transistor under test;

FIG. 5 is an enlarged, fragmentary, plan view of the apparatus illustrated in FIG. 2, showing a separating member in cross-section and the electrical contacts engaged with the conductors of the transistor under test;

FIG. 6 is a fragmentary, enlarged view of the apparatus taken along the line 6—6 of FIG. 2, showing the electrical contacts in engagement with the conductors of the transistor under test and illustrating schematically connections from the transistor under test to a typical test set; and FIG. 7 is an enlarged, perspective view of portions of a pair of separator members disposed in an array of conductors of the transistor under test, illustrating the principles of the present invention.

Figure 1:
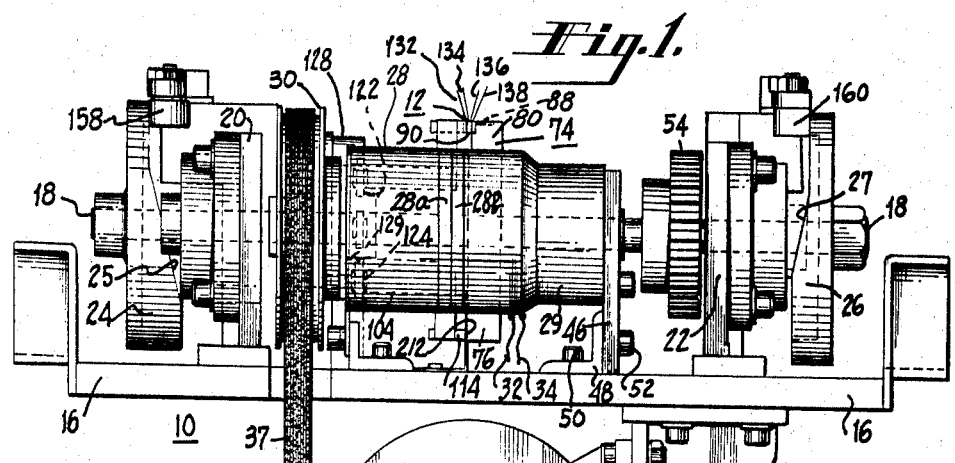
FIG. 1 is a front, elevational view of apparatus for carrying out the improved method.
Figure 3:
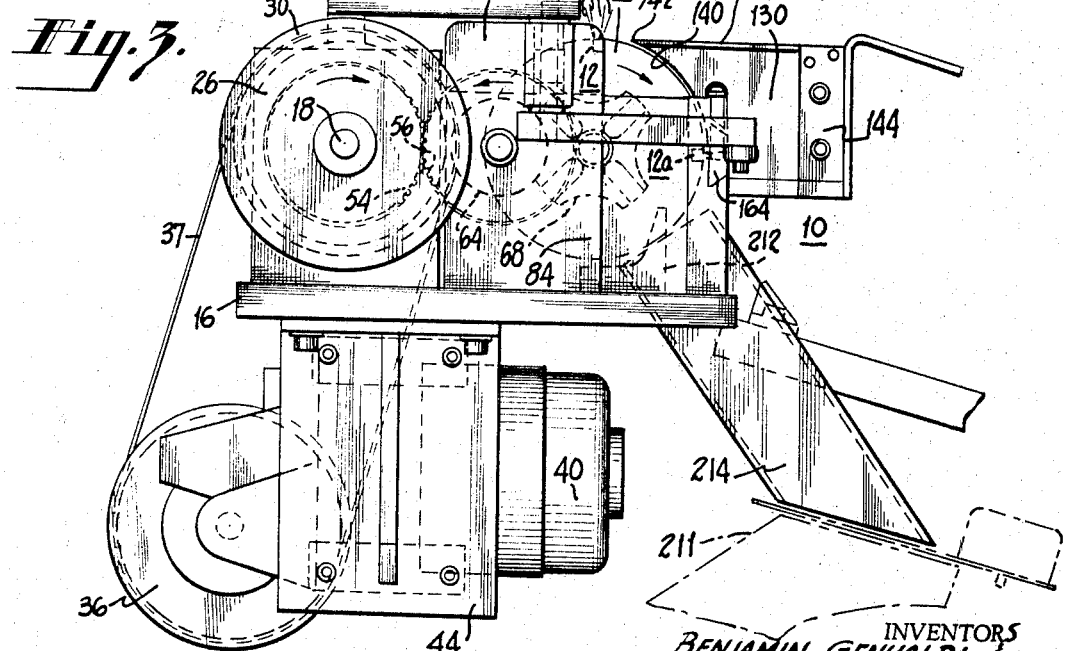
FIG. 3 is a right side, elevational view of the apparatus illustrated in FIG. 1, a portion of a rotary bin used with the apparatus being shown by broken lines.

Referring now to the drawings, particularly to FIGS. 1, 2, and 3, there is shown apparatus 10 for carrying out the method of preparing and presenting an electrical component, such as a transistor 12, to the input of electronic equipment, such as a test set 14 (FIG. 6), for testing purposes. The test set 14, such as model T-460, for example, manufactured by the Atlantis Electronics Corp., Garland, Texas, is suitable for supplying the necessary tests and signals for testing transistors with the apparatus 10.

The apparatus 10 comprises a base 16 adapted to be supported above floor level by any suitable structure, such as legs (not shown). A shaft 18 is mounted for rotation about its axis by two spaced-apart bearing blocks 20 and 22. The blocks 20 and 22 are fixed to the base 16, by any suitable means, and extend upwardly therefrom. The shaft 18 is disposed parallel to the base 16 and is journaled into the bearing blocks 20 and 22.

A pair of rotary slide cams 24 and 26 are fixed to opposite ends of the shaft 18 for rotation therewith.

Cammed surfaces 25 and 27 of the cams 24 and 26, respectively, are on the inner surfaces of the cams for the purpose hereinafter appearing.

An electrically operated clutch 28 and brake 29 assembly, of conventional design, is mounted at about the central portion of the shaft 18 in a manner well known in the art. A rotor 28a of the clutch 28 is splined to the shaft 18. The rotor 28a is adapted to be rotated by a pulley 30 to which it is fixed. When the clutch 28 is engaged, an armature 28b of the clutch 28 is moved towards the rotor 28a, causing the shaft 18 to rotate. When the clutch 28 is disengaged and the brake 29 is applied, the armature 28b is moved towards the brake 29, causing the shaft 18 to stop rotating. The clutch 28 may be engaged and the brake 29 released substantially simultaneously by an electrical signal from the test set 14. This signal is transmitted through electrical leads 32 and 34 connected between a pair of output terminals of the test set 14 and an electrical input to the clutch 28. The pulley 30 is coupled to a pulley 36 by a belt 37. The pulley 36 is fixed to a shaft of a motor 40 through reduction gearing 38 and a suitable slip clutch 42. The motor 40 is disposed beneath the base 16 by a bracket 44 and suitable fastening means and is adapted to be connected to a source of suitable electrical power for continuous rotation.

The brake 29 is mounted on a brake plate 46, and the latter is fixed to the base 16 by a bracket 48 and screws 50 and 52. Thus, the brake 29 is in a fixed position and can not rotate. When the clutch 28 is disengaged and the brake 29 applied, the armature 28b is moved towards the fixed brake 29 and the rotation of the shaft 18 is stopped.

The shaft 18 can be rotated about its axis by the motor 40 through the pulleys 30 and 36 and the belt 37, when the clutch 28 is engaged and the brake 29 is off, that is, when the armature 28b is disengaged from the brake 29. This condition of operation is the normal condition and prevails in the presence of a signal from the test set 14 to the clutch 28. When the signal from the test set 14 is removed from the clutch 28, however, the clutch 28 is disengaged and the brake 29 is applied, the armature 28b being moved towards the brake 29. The latter action stops the rotation of the shaft 18 even though the motor 40 continues to rotate the pulley 30 through the pulley 36 and the belt 37.

A driving gear 54 is fixed to the shaft 18 for rotation therewith and for driving a driven gear 56, the latter being meshed with the former. The gear 56 is fixed to a shaft 58 that is journaled in bearing blocks 60 and 62. The gear 56 is disposed between the bearing blocks 60 and 62, and the latter are fixed to the base 16 and extend upwardly therefrom. The inner end of the shaft 58 is coupled to a drive-pin wheel 64 of a Geneva mechanism 66. A Geneva gear 68 of the Geneva mechanism 66 is coupled to a shaft 70 for rotation therewith. One end of the shaft 70 is journaled in the bearing block 62 and the other end of the shaft 70 is journaled in a bearing block 72, the latter being fixed to the base 16, by any suitable means, and extending upwardly therefrom. Retaining nuts 71 and 73 are fixed to the ends of the shaft 70 to keep it from shifting laterally. A turret 74 is also fixed to the shaft 70 for rotation therewith.

The Geneva mechanism 66 is of the type wherein the Geneva gear 68 rotates 90° for each 360° rotation of the drive-pin wheel 64. Hence, the shaft 70 rotates 90° for each complete (360°) rotation of a shaft 58. The gears 54 and 56 bear a 1:1 ratio to each other; thus, a complete rotation of the shaft 18 causes the turret 74 to rotate 90°, that is, one quarter of a revolution. Thus, the turret 74 rotates with an intermittent motion, moving one quarter of the time (rotating one quarter of a revolution) and dwelling three quarters of the time, during each revolution of the shaft 18. If a longer dwell time of the turret 74 is desired, the clutch 28 and the brake 29 may be actuated by removing the signal from the test set 14 to the clutch 28, thereby stopping the rotation of the shaft 18 and, consequently, stopping the turret 74.

The turret 74 comprises (a) means to receive and secure a component, (b) means to spread and separate the leads of the component, (c) means to move the component to a testing station where electrical contacts can be applied to the saparated leads of the component, and (d) means to remove the component from the testing station and to release the component into a chute for sorting purposes. The turret 74 comprises an indexing disk or dial 76 and a collar 78 extending concentrically to one side therefrom, as shown in FIG. 2. Four nests 80, 82, 84, 86, each spaced 90 degrees from the other, are disposed peripherally around the indexing dial 76 to receive components, such as transistors 12, therein. Each of the nests is formed with an indexing groove, as clearly seen by the indexing groove 92 in the outer surface of the nest 80 (FIG. 2a), to receive therein an indexing tab of a component, such as the indexing tab 88 extending from the rim of the casing can 90 of the transistor 12, Many transistors 12, such as those of the TO–5 and TO–18 types, for example, have indexing tabs.

Four L-arms 100, 102, 104 and 106 are pivotally mounted at their vertexes to four equally spaced radial projections disposed between the indexing dial 76 and the collar 78. A separate clamp is fixed to one end of each of the L-arms, and a separate cam follower is fixed to the opposite end of each of the L-arms. Thus, clamps 110, 112, 114, and 116 are fixed to the ends of the L-arms 100, 102, 104 and 106, respectively, and disposed to cooperate with nests 80, 82, 84, and 86, respectively, for retaining components, such as transistors 12, therein. The clamps 110–116 are urged against the nests 80–86, respectively, by separate springs disposed between the L-arms and the collar 78, as, for example, spring 118 between the L-arm 102 and the collar 78. Cam followers 120, 122, 124, and 126 are disposed at the other ends of the L-arms 100, 102, 104, 106 for cooperating with cams 128 and 129 (FIG. 1) to rotate the L-arms slightly in predetermined positions of the turret 74. The cams 128 and 129 are fixed to the bearing block 72 (FIG. 2) by any suitable means and function to urge the clamps away from the nests to aid in loading the transistor 12 in, and unloading the latter from, the turret 74, respectively.

The transistor 12 may be loaded in the nest 80 when the clamp 108 is slightly removed from the nest 80, as during the engagement of the cam follower 120 with the cam 128. The transistor 12 should be loaded in the nest 80 with its casing can 90 therein and its indexing tab 88 in the indexing groove 92 of the nest 80, as shown in FIGS. 1, 2, and 2a. The transistor 12 is securely clamped in the nest 80 when the turret is rotated (clockwise, looking at the right side of the turret 74 in FIG. 2 of the drawing), that is, when the cam follower 120 is disengaged from the cam 128 and the clamp 110 moves towards the nest 80 due to the action of the spring 118.

A vertical blade 130 of insulating material, is disposed rearwardly of the turret 74 and in a plane that substantially bisects the side of the transistor from which its leads or conductors 132, 134, 136, and 138 extend. The blade 130, which may be made of Teflon or nylon plastic material, has an edge 140 (FIG. 3) that is very slightly spaced from, and follows the contour of, the upper rear portion of the indexing dial 76. The edge 140 terminates in a point 142 at its upper end. The blade 130 is maintained rigidly in the aforementioned position by means of a bracket 144 that is fixed to both the blade 130 and the base 16 by any suitable means. A relatively thin pointed spreader 146, as shown in FIG. 3, may be secured to the upper edge of the blade 130 for the purpose hereinafter appearing.

A transistor 12, whose casing can 90 is disposed in the nest 80, will have its conductors 132 and 134 separated from its conductors 136 and 138 when the turret 74 is rotated 90° (to the testing position), and the blade 130 is disposed between the conductors, separating them into two groups.

Means are provided to apply electrical contacts to each of the conductors of the transistor when the latter is in its testing position. To this end, a pair of off-set lever arms 150 and 152 are pivotally mounted by pivots 154 and 156, respectively, intermediate their ends for partial rotation in planes substantially parallel to the base 16. The pivots 154, 156 are fixed to the base 16 by any suitable means. A pair of cam followers 158 and 160 are fixed to the forward ends of the lever arms 150 and 152, respectively, for cooperation with the cammed surfaces 25 and 27 of the rotary slide cams 24 and 26, respectively. The cammed surfaces 25 and 27 have a contour such that the cam followers 158 and 160 are furthest apart from each other when a transistor, such as the transistor 12a, is in the testing position, as shown in FIG. 2. Under these conditions, the rear ends of the lever arms 150 and 152 will be closest to each other, the lever arms 150 and 152 being levers of the first order.

The transistor 12a is similar to the transistor 12 and represents the latter in the testing position. The reference letter "a" has been added to all parts of the transistor 12a to distinguish them from analogous parts of the transistor 12 in the loading position.

A pair of dovetail slides 162 and 164 (FIG. 6) are disposed for reciprocal sliding motion in complementary dovetail grooves formed in blocks 166 and 168, respectively, the latter blocks being fixed to the rear of the base 16 by any suitable means. The slide 162 is pivotally coupled to the rear end of the lever arm 150 through an adjustable arm 170; and the slide 164 is similarly coupled to the rear end of the lever arm 152 for movement therewith through an adjustable arm 172. The rear ends of the lever arms 150 and 152 are urged toward each other by springs 174 and 176, respectively, the rear ends of the lever arms being moved away from each other only by the action of the slide cams 24 and 26 on the cam followers 158 and 160, respectively.

Referring now particularly to FIGS. 4, 5, and 6 there are shown four resilient electrical contacts 180, 182, 184, and 186 adapted to contact four separate conductors, respectively, extending from the transistor 12a. The contacts 180 and 182 are fastened to a block 190 of insulating material, as by screws, and the block 190 is, in turn, fastened to the inner end of the slide 162. A pin 188 is disposed between the contacts 180 and 182, substantially at right angles to the vertical insulating member 130, and has one end supported by a forced fit in a hole in the end of the slide 162.

The contacts 184 and 186 are disposed in a mirror-image relationship with the contacts 180 and 182 and are secured to an insulating block 192, as by screws. The block 192 is secured to the inner end of the slide 164 for reciprocal movement therewith. The block 192 is formed with a slot 194 to receive the pin 188 therein. The edge 140 of the blade 130 is also formed with a notch 196 (FIG. 7) for receiving the pin 188 therethrough. The pin 188 functions as a horizontal separator member and is covered with insulating material 198, such as Teflon, for example, except for its pointed tip. As the slides 162 and 164 are moved towards each other, the horizontal separator member, pin 188, is adapted to pass between the conductors (of the transistor 12a) on each side of the vertical separator blade 130 so that electrical contacts 180 and 182 engage conductors 134a and 132a, respectively, on one side of the vertical separator member 130, and electrical contacts 184 and 186 engage conductors 138a and 136a, respectively, on the other side of the vertical separator member 130, as shown in FIG. 6.

The contacts 180, 182, 184, and 186 are connected to the input terminals of the test set 14 (FIG. 6) through electrical leads 200, 202, 204, and 206, respectively, so that the transistor 12a can be tested when the contacts 180, 182, 184, and 186 are electrically engaging the separated and electrically isolated conductors 134a, 132a, 138a, and 136a, respectively, of the transistor 12a. During the testing period, the signal from the test set 14 to the clutch 28, via leads 32 and 34, is removed, preventing rotation of the shaft 18. The signal from the test set 14 to the clutch 28 is not applied again until the testing of the transistor 12a is completed. Thus, the shaft 18 will rotate only when the testing of the transistor has been completed.

A signal indicating the condition of the transistor 12a under test is provided by the test set 14, and this signal is transmitted by leads 208 and 210 to conventional sorting means (not shown) for positioning a rotary bin 211 (FIG. 3) appropriately to receive the transistor 12a therein. After the transistor 12a has been tested, the turret 74 is rotated, and the cam follower 122 of the L-arm 102 associated with the tested transistor 12a engages the cam 129, moving the clamp 112 away from the tested transistor 12a, so that it may be ejected from the nest 82 by means of a stripper 212. The stripper 212 is a thin sheet of metal fixed to the base 16, extending upwardly to the turret 74, and disposed to eject the tested transistor 12a from the turret 74. The ejected transistor 12a falls into a chute 214 which is aligned with the aforementioned rotary bin 211 whose position is determined by an output signal from the test set 14.

The method of preparing and presenting an electrical component for testing purposes will now be explained, with the aid of the apparatus 10. Let it be assumed that the motor 40 is energized and the turret 74 is rotated intermittently in 90° increments, moving one quarter of the time and dwelling three quarters of the time of each revolution of the shaft 18, as explained heretofore. Under these conditions, the clutch 28 is engaged and the brake 29 is released due to a signal to it from the test set 14. A component to be tested by the test set 14 is loaded manually onto the apparatus 10 during each dwell time of the turret 74. Thus, the transistor 12 is inserted manually into the topmost nest, such as the nest 80, while the clamp 134 is cammed away from the nest 80 by the action of the cam follower 120 and the cam 128. The casing can 90 of the transistor 12 is inserted into the nest 80 so that the transistor's indexing tab 88 is disposed in the indexing groove 92 of the nest 80.

The transistor 12 is moved to the testing position, illustrated by the transistor 12a, during the next motion period of the turret 74. In moving from the loading position to the testing position, the pointed end 142 of the blade 130 and the spreader 146 are forced between the conductors of the transistor 12a, separating the conductors 132a and 134a from the conductors 136a and 138a, that is, the conductors of the transistor 12a are separated into two groups, as shown in FIG. 7. After the movement of the transistor from the loading position to the testing position, the slides 162 and 164 are moved toward each other by the camming action of the cammed surfaces 25 and 27 of the cams 24 and 26 on the cam followers 158 and 160. While the transistor is in the testing position, the pointed end of the pin 188 passes through the slot 196 in the blade 130 (FIG. 7), separating the conductor 132a from the conductor 134a and the conductor 136a from the conductor 138a. Thus, conductors 132a, 134a, 136a, and 138a are divided into four groups, each conductor being insulated from the other, and the resilient contacts 182, 180, 186, and 184 are urged against the conductors 132a, 134a, 136a, and 138a, respectively, as shown in FIG. 6. If the transistor 12a had only three conductors, such as conductors 132a, 134a, and 136a, for example, the insulating members 130 and 188 would divide the conditions into three groups.

The transistor 12a can now be tested by the test set 14 during the dwell time of the transistor 12a in the testing position. During the testing period, the signal from the test set 14 to the clutch 28 is removed, thereby preventing rotation of the shaft 18 and turret 74. For most purposes, the dwell time is sufficient to test the transistor. After the testing is completed, the signal from the test set 14 to the clutch 28 is applied again, and the turret 74 can be rotated. Thus, if more time than the normal dwell time is necessary for testing, the automatic removal of the signal from the clutch 28 stops the rotation of the turret 74 until the testing is completed. Also, as a result of one or more tests provided by the test set 14, a signal is provided, via leads 208 and 210, to means (not shown) to position the bin 211 in an appropriate position with respect to the chute 214 for eventually sorting the tested transistor 12a in an appropriate bin.

While the transistor 12a is being tested, a new transistor 12 may be inserted into the topmost nest of the turret 74 for subsequent testing.

After the testing period, the turret 74 is again rotated 90°. During this latter rotation, the cam follower 122, associated with the clamp 112 holding the transistor 12a in the nest 82, engages the cam 129 so that the stripper 212 can eject the transistor 12a from the nest. The transistor 12a falls through the chute 214 and into the bin 211, the position of the bin 211 having been determined previously by a sorting signal from the test set 14.

From the foregoing description it will be apparent that there has been provided an improved method of preparing and presenting a component having leads extending from one side thereof to electrical apparatus for testing purposes. While the component described for illustrative purposes in connection with the improved method has been a transistor with four conductors, and an indexing tab, it is apparent that components without indexing tabs and/or having only two or three conductors can also be tested by the method described as long as the component is oriented so that insulating members can be disposed between the conductors to isolate them. Also, while some variations in the operations of the present method have been described, other variations in these operations, all coming within the spirit of the invention, will, no doubt, readily suggest themselves to those skilled in the art. Hence, it is desired that the foregoing description shall be considered as illustrative and not in a limiting sense.

What is claimed is:

1. A method of applying each lead of a multi-lead electrical component to a separate contact for connection with multi-input electrical apparatus with the aid of two separators, wherein one of said separators comprises a blade-like sheet of material having a pointed end including one edge thereof, the other of said separators comprises an elongated member having a pointed end, and said electrical component has at least three flexible leads extending from one side thereof, said method comprising the steps of:

providing relative motion between said component and said one separator, along a first path, to insert said one separator, with its pointed end first, among said leads and to separate said leads into two groups and disposing said one edge adjacent to said one side of said component, providing relative motion between said component and said other separator, along a second path transverse to said first path, and inserting said other separator, with its pointed end first, among said leads and between said one side of said component and said one separator, and separating two of said leads in at least one of said groups, and moving a separate one of said contacts against each of said leads, respectively, along paths substantially parallel to said second path and adjacent to said other separator, whereby to connect each of said leads to said electrical apparatus.

2. A method of applying each lead of a multi-lead electrical component to a separate input contact of multi-input electrical apparatus with the aid of two separators, wherein one of said separators comprises a sheet of insulating material having a notch in one edge intermediate the ends thereof, one of said ends being a pointed end, the other of said separators comprises an elongated member having a surface of insulating material and a pointed end, and said electrical component has three leads extending from one side thereof, said method comprising the steps of inserting said one separator, with its pointed end first, substantially perpendicularly to said one side of said component, among said leads, separating said leads into two groups of one lead and two leads, respectively, and disposing said notch adjacent to said one side of said component along an imaginary line that substantially bisects the distance between said two leads in one of said two groups, inserting said other separator, with its pointed end first, through said notch, parallel to said imaginary line, whereby its surface of insulating material separates said two leads in said one of said two groups from each other, and moving said contacts, along paths parallel to said imaginary line, adjacent to said other separator and against each of said leads, respectively, whereby to connect electrically each of said leads to said electrical apparatus.

3. A method of applying each lead of a multi-lead electrical component to a separate input contact of multi-input electrical apparatus with the aid of two separators, wherein one of said separators comprises a sheet of insulating material having a notch in one edge intermediate the ends thereof, one of said ends being a pointed end, the other of said separators comprises an elongated member having a surface of insulating material and a pointed end, and said electrical component has four leads extending from one side thereof, the improvement in said method comprising the steps of:

inserting said one separator, with its pointed end first, substantially perpendicular to said one side of said component, among said leads thereof, separating said leads into two groups of two leads each, and disposing said notch adjacent to said one side of said component, inserting said other separator, with its pointed end first, through said notch, along a first path transverse to a major surface of said sheet, whereby said surface of insulating material of said other separator separates each of said two leads in each of said two groups from each other, and moving two pairs of said contacts towards each other from opposite sides of said one separator, along paths parallel to said first path, adjacent to said other separator and into engagement with said leads, respectively, whereby to connect electrically each of said leads to said electrical apparatus.

References Cited

UNITED STATES PATENTS

| 3,230,608 | 1/1966 | Adams | 29—629 |
| 3,231,693 | 1/1966 | McLaughlin | 200—46 XR |
| 3,238,455 | 3/1966 | Jankowski | 324—158 |

RUDOLPH V. ROLINEC, *Primary Examiner.*

E. L. STOLARUN, *Assistant Examiner.*